(12) United States Patent
Wu et al.

(10) Patent No.: US 8,660,392 B2
(45) Date of Patent: Feb. 25, 2014

(54) OPTICAL CABLE AND OPTICAL CABLE SYSTEM

(75) Inventors: Wenxin Wu, Shenzhen (CN); De Li, Shenzhen (CN); Jun Zhao, Shenzhen (CN); Yunsheng Wen, Shenzhen (CN); Yanhua Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/300,038

(22) Filed: Nov. 18, 2011

(65) Prior Publication Data

US 2012/0063732 A1     Mar. 15, 2012

Related U.S. Application Data

(63) Continuation of application No. PCT/CN2010/074763, filed on Jun. 30, 2010.

(30) Foreign Application Priority Data

Jul. 3, 2009   (CN) .......................... 2009 1 0139853

(51) Int. Cl.
    *G02B 6/44*     (2006.01)
(52) U.S. Cl.
    USPC .......................................................... 385/104
(58) Field of Classification Search
    USPC ................................................. 385/100, 104
    See application file for complete search history.

(56) References Cited

U.S. PATENT DOCUMENTS

| | | | |
|---|---|---|---|
| 4,784,461 A * | 11/1988 | Abe et al. ...................... | 385/112 |
| 4,807,962 A * | 2/1989 | Arroyo et al. .................. | 385/105 |
| 4,826,279 A * | 5/1989 | Nishimura et al. ........... | 385/102 |
| 5,517,591 A | 5/1996 | Wagman et al. | |
| 5,638,478 A | 6/1997 | Iwakura et al. | |
| 5,751,881 A * | 5/1998 | Konda et al. .................. | 385/110 |

(Continued)

FOREIGN PATENT DOCUMENTS

| | | |
|---|---|---|
| CN | 1116313 A | 2/1996 |
| CN | 1257213 A | 6/2000 |

(Continued)

OTHER PUBLICATIONS

International Search Report issued in corresponding PCT Patent Application No. PCT/CN2010/074763, mailed Oct. 21, 2010.

(Continued)

*Primary Examiner* — Charlie Peng
*Assistant Examiner* — Mary El Shammaa
(74) *Attorney, Agent, or Firm* — Brinks Gilson & Lione

(57) ABSTRACT

Embodiments of the present disclosure disclose an optical cable and an optical cable system, where the optical cable includes an SZ-shaped optical cable skeleton and a plurality of optical fiber units. Skeleton slots is recessed in a periphery of the optical cable skeleton, and the plurality of optical fiber units is grouped and respectively disposed in the corresponding skeleton slots, thereby having the advantages of being easy to strip and draw, high reliability, and long lifetime. Moreover, the optical fiber does not need to be connected when being diverged on floors during installation, thereby reducing the fusion splicing/termination connection time, simplifying the optical cable wiring, greatly reducing deployment cost of an Optical Distribution Network (ODN), and speeding up the scale deployment of the FTTX ODN; in addition, interference among the optical fibers is avoided when the optical fibers are drawn, thereby increasing reliability of the optical fibers after installation.

10 Claims, 4 Drawing Sheets

(56) References Cited

U.S. PATENT DOCUMENTS

| | | | |
|---|---|---|---|
| 6,243,519 B1 | 6/2001 | Ishikawa et al. | |
| 6,795,625 B1* | 9/2004 | Ishii et al. | 385/110 |
| 6,895,150 B2* | 5/2005 | Stingl | 385/110 |
| 6,915,050 B2* | 7/2005 | Koyasu et al. | 385/105 |
| 6,915,051 B2* | 7/2005 | Ishii et al. | 385/110 |
| 2003/0099447 A1* | 5/2003 | Stingl | 385/110 |
| 2004/0156601 A1* | 8/2004 | Koyasu et al. | 385/100 |
| 2004/0247265 A1* | 12/2004 | Takano et al. | 385/100 |
| 2005/0031275 A1* | 2/2005 | Ishii et al. | 385/100 |
| 2006/0045459 A1* | 3/2006 | Lalonde | 385/147 |
| 2012/0063732 A1 | 3/2012 | Wu et al. | |

FOREIGN PATENT DOCUMENTS

| | | |
|---|---|---|
| CN | 1393718 A | 1/2003 |
| CN | 2876811 Y | 3/2007 |
| CN | 201181350 Y | 1/2009 |
| JP | 9178991 A | 7/1997 |
| JP | 2005331711 A | 12/2005 |
| KR | 20000023391 A | 4/2000 |
| KR | 100622054 B1 | 9/2006 |
| WO | WO 2008147192 A1 | 12/2008 |

OTHER PUBLICATIONS

Written Opinion of the International Searching Authority issued in corresponding PCT Patent Application No. PCT/CN2010/074763, mailed Oct. 21, 2010.

Hu et al., "New Type Optical Distribution Cables and Srop-In Cables for Access Network" Optical Communication Technology, vol. 23, No. 2, 1998.

Liehui et al., "Research on FTTx Network Construction Method" Guangdong Communication Technology, Sep. 2006.

Office Action issued in corresponding Chinese Patent Application No. 200910139853.2, mailed Feb. 29, 2012.

Office Action issued in corresponding Australian Patent Application No. 2010268582, mailed Jan. 23, 2013.

Office Action issued in corresponding Chinese Patent Application No. 200910139853.2, mailed Dec. 5, 2012.

Office Action issued in corresponding Mexican Patent Application No. MX/a/2011/013418, mailed Oct. 8, 2012.

Office Action issued in corresponding Korean Patent Application No. 10-2011-7028125, mailed May 16, 2013, 5 pages.

Examination Report issued in corresponding Australian Patent Application No. 2010268582, mailed Oct. 17, 2012.

Office Action issued in corresponding Chinese Patent Application No. 200910139853.2, mailed May 28, 2013, 14 pages.

Extended European Search Report issued in corresponding European Patent Application No. 10793607.2, mailed Dec. 17, 2012.

Office Action issued in corresponding Korean Patent Application No. 10-2011-7028125, mailed Nov. 27, 2012.

Office Action issued in corresponding Mexican Patent Application No. MX/a/2011/013418, mailed Apr. 16, 2013.

* cited by examiner

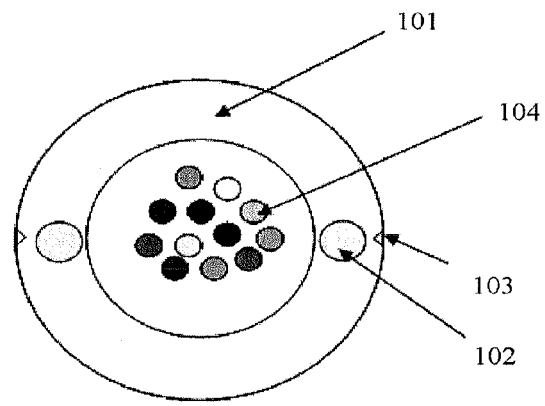
FIG. 1 (Prior Art)
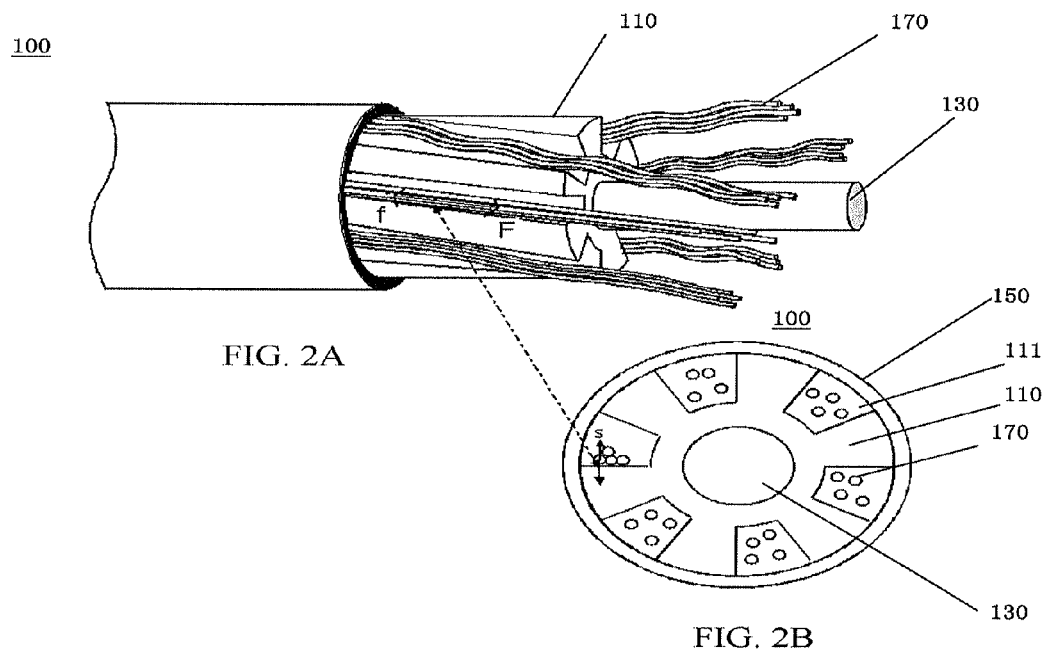
FIG. 2A
FIG. 2B

OPTICAL CABLE AND OPTICAL CABLE SYSTEM

CROSS-REFERENCE TO RELATED APPLICATIONS

This application is a continuation of International Application No. PCT/CN2010/074763, filed on Jun. 30, 2010, which claims priority to Chinese Patent Application No. 200910139853.2, filed on Jul. 3, 2009, both of which are hereby incorporated by reference in their entireties.

FIELD OF THE DISCLOSURE

The present disclosure relates to an optical cable for network wiring, and in particular, to an optical cable and an optical cable system applicable to wiring in a building.

BACKGROUND OF THE DISCLOSURE

Fiber To The Home (FTTH) is difficult to be run in a building, which is the main factor affecting the commercial scale application of the FTTH. Due to a complicated environment, laying an indoor optical cable is a great challenge for deployment of an FTTH network. The major problems are as follows.

(1) A common vertical wired product needs to be diverged and connected in a stair well. Not only a professional person and tool but also a fiber distribution box occupying a large space is needed.

(2) When the product is diverged in the stair well, the connection of fiber increases the engineering cost and at the same time increases the loss of optical fibers.

(3) Space of the stair well is small, and a construction environment is poor, thereby increasing the construction difficulty.

The commercial scale application of the FTTH is affected due to the high running cost of the FTTH. In order to find a running manner having a reduced cost and initiate the commercial scale application of FTTX, the industry keeps an eye on Fiber To The MDU (Multiple Dwelling Unit) (FTTM). Compared with the FTTH, the FTTM can increase service penetration gradually, and is more beneficial to service providers.

A conventional wiring solution of an FTTM optical cable is specifically as follows.

As shown in FIG. 1, a conventional optical cable appropriate for being vertically run in a building includes a low-smoke halogen-free flame retardant sheath 101 at an outer layer and easy-to-strip optical fiber units 104 in an inner part, where glass reinforcing ribs 102 are disposed in the low-smoke halogen-free flame retardant sheath 101, and sheath reinforcing ribs identifications 103 are disposed on a corresponding outer surface.

The method of vertically running the optical cable mainly includes the following steps (it is assumed that a user lives in the second floor): (1) installing a distribution box in a basement; (2) installing a vertical optical cable; (3) windowing the outer jacket of the vertical optical cable on the fourth or higher floor (according to the length requirement); (4) selecting an optical fiber to be pulled to the second floor, and shearing the optical fiber; (5) windowing the outer jacket of the optical cable on the second floor; (6) drawing the optical fiber sheared on the fourth floor; and (7) connecting the drawn optical fiber to the user premise.

Disadvantages of the above solution are as follows. Firstly, the length of the drawn optical fiber is limited to a certain extent, and if a distance to home of a customer is long, a further connection is required; secondly, the optical fiber needs to be windowed and sheared on an upper floor before being drawn, and interference among the optical fiber units exists during drawing; thirdly, when the number of cores of the optical cable is relatively large, the optical fiber to be sheared is difficult to be found; and fourthly, since the optical fiber unit stands in the outer jacket, the vertical height is limited, or a special measure must be adopted.

SUMMARY OF THE DISCLOSURE

Accordingly, embodiments of the present disclosure provide an optical cable and an optical cable system applicable to wiring in a building.

An embodiment of the present disclosure provides an optical cable. The optical cable includes an SZ-shaped optical cable skeleton and a plurality of optical fiber units. A plurality of skeleton slots is recessed in the periphery of the skeleton. The plurality of optical fiber units is grouped and respectively disposed in the corresponding skeleton slots.

Another embodiment of the present disclosure provides an optical cable system, which is applicable to a building having a plurality of floors. The system includes a distribution box and a plurality of optical cables connected to the distribution box. The optical cable includes an SZ-shaped optical cable skeleton and a plurality of optical fiber units. A plurality of skeleton slots is recessed in the periphery of the optical cable skeleton. The plurality of optical fiber units is grouped and respectively disposed in the corresponding skeleton slots, and all or a part of the optical fiber units in the skeleton slot are led and extended to a user premise on a corresponding floor through a splitter.

The optical cable and the building optical cable system according to the embodiments of the present disclosure adopt the SZ-shaped optical cable skeleton, so that inner optical fibers can be provided with protection and prevented from being extruded, and the optical fiber unit can recline on an inner wall of the skeleton after being vertically placed, so as to ensure that the optical fiber unit is uniformly stressed in the vertical optical cable, thereby achieving the purpose of prolonging the lifetime of the optical fiber, having the advantages of being easy to strip and draw, high reliability, and long lifetime. Moreover, the optical fiber units in the optical cable and the building optical cable system according to the embodiments of the present disclosure are disposed in the skeleton slots of the SZ-shaped optical cable skeleton according to requirements. When vertical wiring installation is performed in the building through the optical cable, the optical fiber does not need to be connected when being diverged on floors and may be directly run to home, thereby reducing the fusion splicing/termination connection time, simplifying the optical cable wiring, greatly reducing the deployment cost of an Optical Distribution Network (ODN), and speeding up the scale deployment of the FTTX ODN; in addition, interference among the optical fibers is avoided when the optical fibers are drawn, thereby increasing the reliability of the optical fibers after installation.

BRIEF DESCRIPTION OF THE DRAWINGS

FIG. 1 is a schematic structure diagram of an optical cable in the prior art;

FIG. 2A is a schematic three-dimensional structure diagram of an optical cable applicable to vertical wiring according to an embodiment of the present disclosure;

FIG. 2B is a schematic cross-sectional diagram of the optical cable shown in FIG. 2A;

DETAILED DESCRIPTION OF THE EMBODIMENTS

Figure 3:
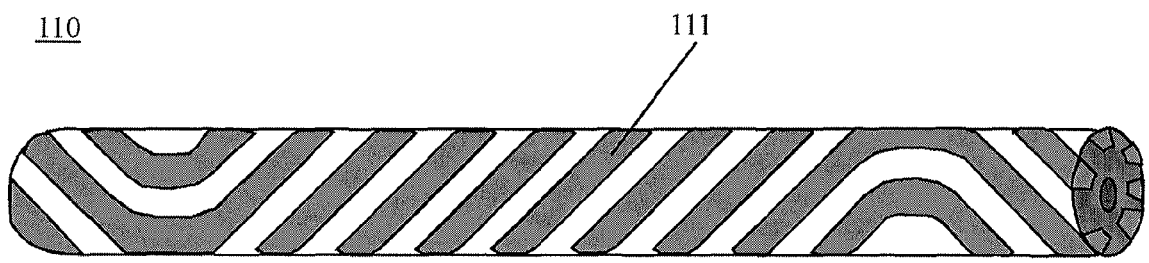
FIG. 3 is a schematic structure diagram of a skeleton adopted in an optical cable according to an embodiment of the present disclosure.

Embodiments of the present disclosure firstly provide an optical cable for wiring. The optical cable is applicable to vertical wiring in a building (room) and includes an SZ-shaped optical cable skeleton and an outer protective sheath. A plurality of skeleton slots is recessed in the periphery of the skeleton, and optical fiber units in the optical cable are grouped and respectively disposed in the corresponding skeleton slots. Since the SZ-shaped optical cable skeleton is adopted, inner optical fibers can be provided with protection and prevented from being extruded, and the optical fiber units can recline on inner walls of the skeleton after being vertically placed, so as to ensure that the optical fiber units are uniformly stressed in the vertical optical cable, thereby achieving the purpose of prolonging the lifetime of the optical fiber.

Correspondingly, an embodiment of the present disclosure further provides an optical cable system, which may be applicable to a building having a plurality of floors. The system includes a distribution box and a plurality of optical cables connected to the distribution box. The optical cable includes an SZ-shaped optical cable skeleton and a plurality of optical fiber units. A plurality of skeleton slots is recessed in the periphery of the optical cable skeleton. The plurality of optical fiber units is grouped and respectively disposed in the corresponding skeleton slots, and all or a part of the optical fiber units in the skeleton slot are led and extended to a user premise on a corresponding floor through a splitter.

Since the optical fiber units in the optical cable are respectively disposed in the skeleton slots of the SZ-shaped optical cable skeleton as required, the optical fiber does not need to be connected when being diverged on each floor, and may be directly run to home. Moreover, the interference generated when the optical fibers are drawn is avoided.

The following describes specific implementation of the present disclosure in further details with reference to the accompanying drawings and specific embodiments.

As shown in FIG. 2A and FIG. 2B, in this embodiment, a optical cable 100 applicable to vertical wiring includes an SZ-shaped optical cable skeleton 110, an outer protective sheath 150 on the periphery of the skeleton, and optical fiber units 170. A strength member 130 is disposed in the center of the skeleton 110, and a plurality of skeleton slots 111 is recessed in the periphery of the skeleton 110 uniformly. An accommodating space for accommodating the optical fiber units 170 is formed between each skeleton slot 111 and the outer protective sheath 150. The optical fiber units 170 to be disposed in the optical cable are grouped and respectively disposed in the corresponding skeleton slots 111.

In this embodiment, the optical cable 100 has 24 cores (that is, the number of optical fiber units 170 inside the optical cable 100 is 24). The number of skeleton slots 111 is six; four tight buffered optical fibers are disposed in each skeleton slot 111; and the optical fiber units in each skeleton slot 111 are distinguished through a color code. It should be understood that, the number and grouping of the optical fiber units 170 inside the optical cable 100 may be specifically determined according to actual requirements. The configuration of dividing the 24 cores into six groups is only an optional embodiment.

In addition, in this embodiment, the optical fiber unit 170 is a tight buffered optical fiber unit, which includes an optical fiber and a tight buffer tube disposed on the periphery of the optical fiber. The optical fiber complies with the G.657 optical fiber standard, and the tight buffer tube is a 900 μm tight buffer tube. Moreover, the optical fiber unit 170 may be identified through a full color spectrum.

Figure 4:
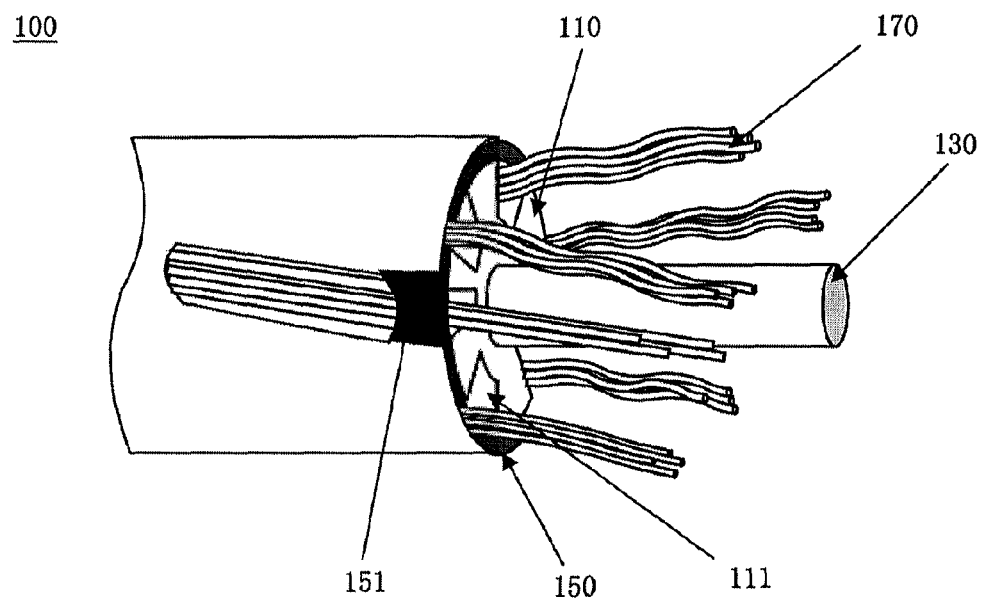
FIG. 4 is a schematic three-dimensional structure diagram of an optical cable applicable to vertical wiring according to another embodiment of the present disclosure.

Further, as shown in FIG. 4, optical fiber identifications 151 may be disposed at positions of the protective sheath 150 corresponding to the skeleton slots 111 of the SZ-shaped optical cable skeleton 110. For example, metal lines (or metal strips) may be nested in corresponding positions on a surface of the protective sheath 150. The optical fiber identifications 151 may help to accurately locate the positions of the skeleton slots 111 to be windowed during installation, so as to correctly find the corresponding optical fiber units 170.

Referring to FIG. 2A, FIG. 2B and FIG. 2, FIG. 3 is a schematic structure diagram of the SZ-shaped optical cable skeleton 110 according to an embodiment of the present disclosure. The embodiment of the present disclosure adopts the SZ-shaped optical cable skeleton 110, so as to provide protection for the inner optical fiber units 170 and prevent the optical fiber units 170 from being extruded.

Specifically, in the SZ-shaped optical cable skeleton 110, the skeleton slots 111 are distributed on the periphery of the skeleton 110 in an S-Z spiral shape. Moreover, in a cross sectional view of the SZ-shaped optical cable skeleton 110, the plurality of skeleton slots 111 are uniformly distributed in edge positions of the cross section of the skeleton 110. For specific distribution of the skeleton slots 111, reference may be made to FIG. 3. Since optical fiber units 170 are grouped and disposed in the skeleton slots 111 distributed in the S-Z shape, it may be construed as that the optical fiber units 170 are S-Z-twisted after being grouped.

In the optical cable skeleton 110, each skeleton slot 111 has a bottom surface and two inner walls, and an opening of the skeleton slot 111 is slightly wider than the bottom surface, so that the two inner walls inclined with respect to the bottom surface at a certain angle respectively. It should be noted that, a specific S-Z angle of the SZ-shaped optical cable skeleton 110 and inclination angles of the inner walls of the skeleton slot 111 with respect to the ground may be determined according to a stressed condition of the optical fiber unit 170 disposed in the skeleton slot 111 after the optical cable is vertically placed.

After the optical cable having the foregoing structure is vertically placed, the optical fiber units 170 disposed inside the skeleton slots 111 can recline on the inner walls of the skeleton slots 111 and keep being stressed uniformly. Specifically, as shown in FIG. 2A and FIG. 2B, N is a pressure of the optical fiber unit 170 on the inner wall of the skeleton slot 111; S is a support force of the inner wall of the skeleton slot 111 for the optical fiber unit 170; F is a vertical pull force suffered by the optical fiber unit 170 due to gravity; and f is a friction force of the inner wall of the skeleton slot 111 for the optical fiber unit 170. Through the optical cable structure according to the embodiment of the present disclosure, a suitable S-Z angle and/or suitable inclination angles of the inner walls of the skeleton slot 111 with respect to the bottom surface may be selected according to requirements, so that the support force and the friction force of the inclined plane of the inner wall of the SZ-shaped skeleton slot 111 for the optical fiber unit 170 ensure that the optical fiber unit 170 is stressed uniformly after the optical cable is vertically placed, thereby achieving the purpose of prolonging the lifetime of the optical fiber.

Furthermore, according to the embodiment of the present disclosure, the optical fiber units 170 in the optical cable are grouped to be effectively distributed to different skeleton slots 111. The optical fiber units 170 in the optical cable skeleton slots 111 may be distinguished through a color code, and interference among the optical fibers can be reduced when the optical fibers are drawn.

Specifically, the number of optical fiber units 170 in each skeleton slot 111 of the optical cable may be an integral multiple of the number of supported users on each floor. In this embodiment, four tight buffered optical fiber units 170 are disposed in each skeleton slot 111 and correspond to four users on each floor. Definitely, the present disclosure is not limited thereto. For example, if five users exist on a certain floor, a solution of disposing eight tight buffered optical fiber units 170 in each skeleton slot 111 may also be adopted. Moreover, a certain space should be reserved after the optical fiber units 170 are distributed in each optical cable skeleton slot 111, which facilitates drawing the optical fiber from the optical cable skeleton slot 111 during construction.

Figure 5:
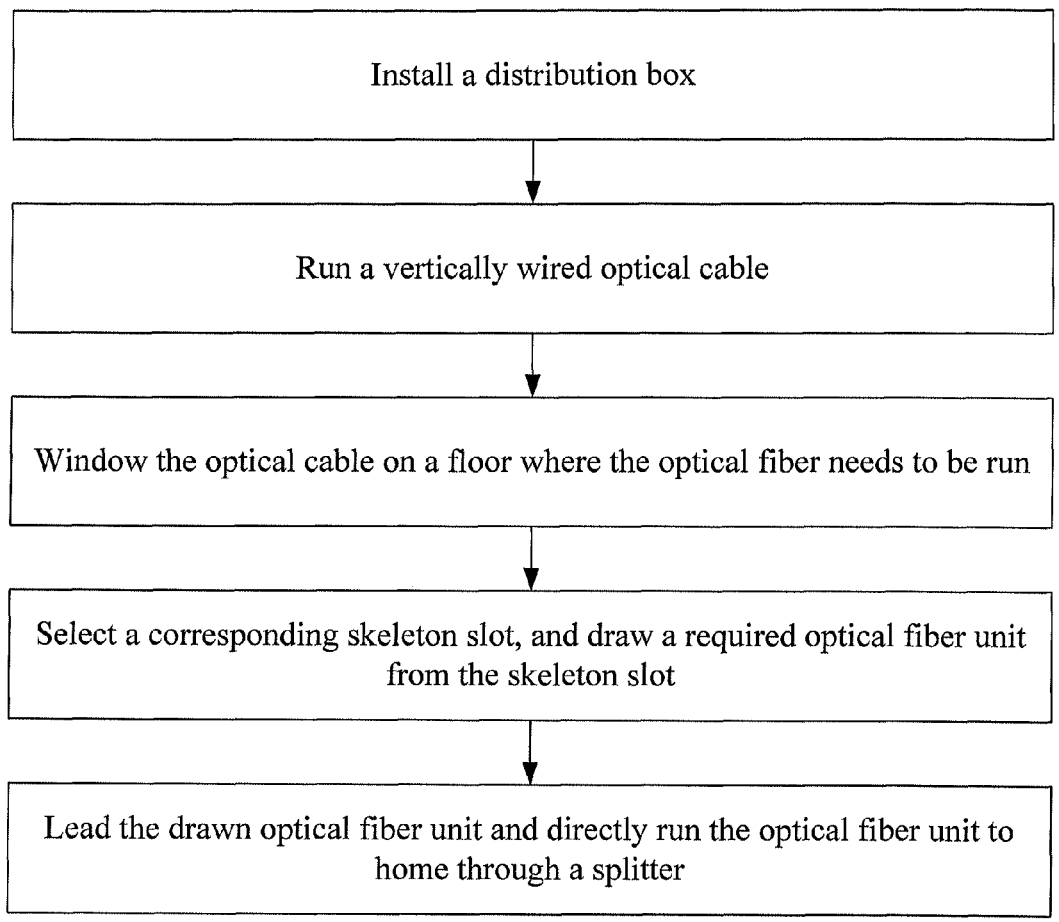
FIG. 5 is a flow chart of a method of performing vertical wiring installation in a building using an optical cable according to an embodiment of the present disclosure.
Figure 6:
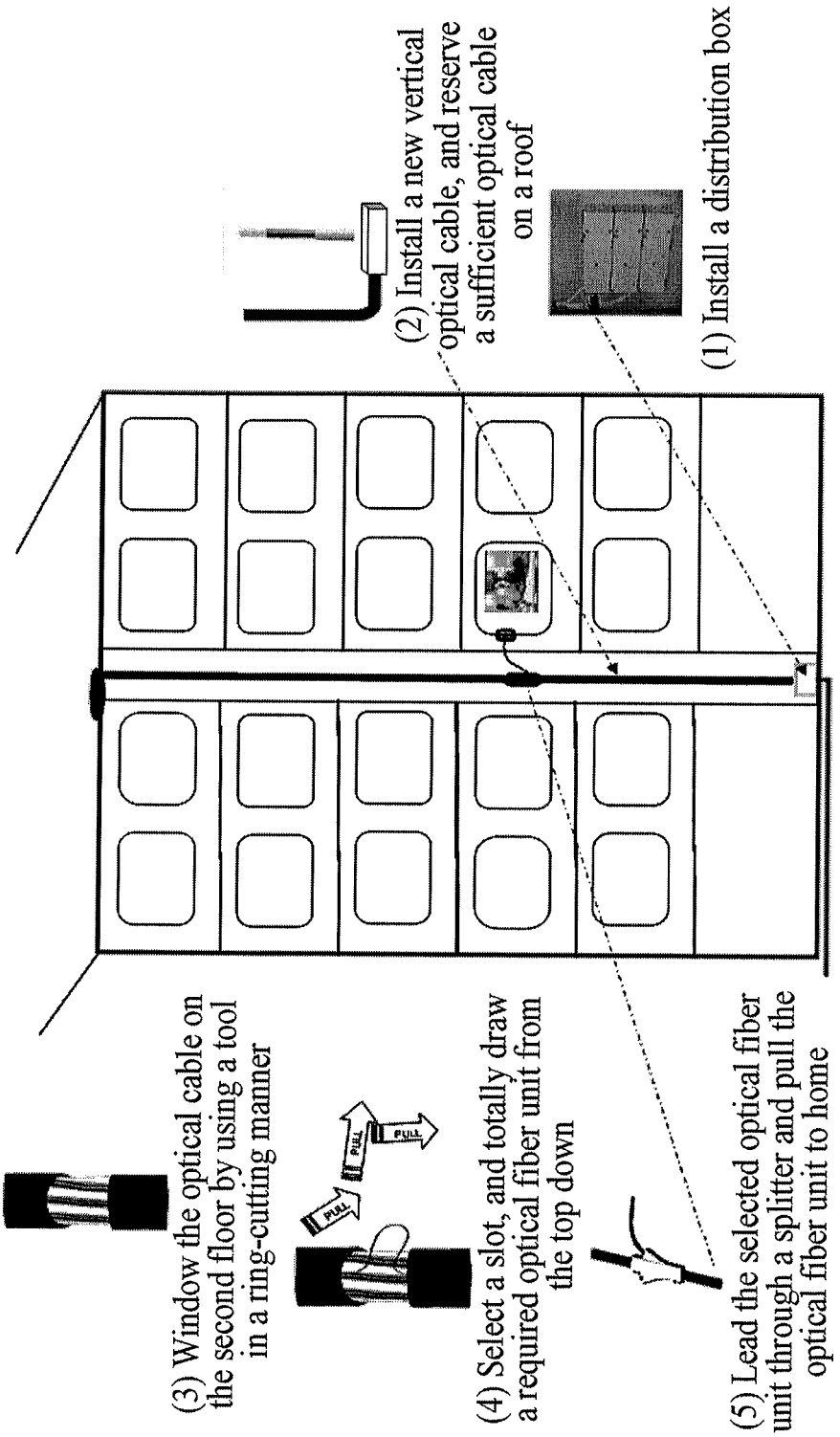
FIG. 6 is a schematic diagram of implementation of the method of performing vertical wiring installation in a building using an optical cable according to an embodiment of the present disclosure.

The following describes a method for vertically running and installing the optical cable according to this embodiment in a building. It is assumed that a user is on the second floor. An installation method shown in FIG. 5 may be adopted when the vertically wired optical cable according to the embodiment of the present disclosure is installed in the building. A specific installation process is shown in FIG. 6. The installation method includes the following steps.

(1) Install a distribution box.

(2) Run a optical cable applicable to vertical wiring, where when the optical cable is run, the length of the vertical optical cable may be greater than a maximum distance of the optical fiber to home, so as to ensure that the optical fiber does not need to be connected in the process of being run to home, and a redundant portion of the optical cable may be placed on a roof.

(3) Window the optical cable on a floor where the optical fiber needs to be run. Specifically, the optical cable may be windowed in a manner of ring-cutting a protective sheath of the optical cable or windowing along a skeleton slot.

(4) Select a corresponding skeleton slot, draw a required optical fiber unit from the skeleton slot, and cover the cut window with a protection box. Specifically, the required optical fiber unit may be totally drawn from the top down, or in order to avoid the problem that the optical fiber is broken due to a too large friction force generated when a too long optical fiber unit is drawn, the optical fiber unit may be sheared on a certain floor of upstairs according to a specific length requirement to shorten a drawing length.

(5) Lead the drawn optical fiber unit and directly run the optical fiber unit to home through a splitter, where the drawn optical fiber unit is directly run to home after passing through the splitter without any intermediate connection.

It can be known that, with the configuration of the optical cable according to the embodiment of the present disclosure, the optical fiber unit inside the skeleton slot reclines on the inner wall of the skeleton slot, thus an optical fiber with a great length may be conveniently drawn after the optical cable is windowed, and the optical fiber does not need to be connected when being diverged on the floor during installation, and may be directly run to home. Moreover, the optical cable effectively arranges the optical fiber units into groups, so that the interference among the optical fiber units may be avoided when the optical fibers are drawn. Furthermore, the suitable S-Z angle determined according to actual requirements may ensure that the optical fiber unit is uniformly stressed in the vertically placed optical cable. When the optical cable is completely wired in the building according to the optical cable installation method, at least one building optical cable system is formed in the building.

In a specific embodiment, the building optical cable system may include a distribution box and a plurality of optical cables connected to the distribution box. The optical cable includes an SZ-shaped optical cable skeleton and a plurality of optical fiber units. A plurality of skeleton slots is recessed in the periphery of the optical cable skeleton. The plurality of optical fiber units is grouped and respectively disposed in the corresponding skeleton slots, and all or a part of the optical fiber units in the skeleton slot are led and extended to a user premise on a corresponding floor through a splitter.

The optical cable in the system may adopt the optical cable 100 according to the foregoing embodiments, and a specific structure thereof may be obtained with reference to the foregoing embodiments. Furthermore, in the system, the number of optical fiber units in each skeleton slot of the optical cable is an integral multiple of the number of users on each floor in the building. Moreover, the optical cable further includes an outer protective sheath, where the outer protective sheath includes a window for leading the optical fiber unit, and the window is a ring-shaped window or a window disposed along the skeleton slot.

Definitely, it should be understood that, the building optical cable system according to the embodiment of the present disclosure may also be obtained through other optical cable installation methods.

Although the present disclosure is described through specific embodiments, the embodiments are not intended to limit the claims. For example, the optical cable may be used for not only vertical wiring but also horizontal wiring. For example, an optical cable is led to a certain floor, and a certain number of cores of optical fibers are diverged to an office or a tabletop. A specific construction method and steps thereof are the same as those for vertical wiring. Therefore, any replacements of equivalent components made by persons skilled in the art without departing from the idea and scope of the claims or any equivalent variations and modifications made according to the patent protection scope of the present disclosure should fall within the scope of the claims.

What is claimed is:

1. An optical cable, comprising:
   an optical cable skeleton; and
   a plurality of optical fiber units that are grouped into multiple optical fiber groups;
   wherein a plurality of skeleton slots are recessed in a periphery of the optical cable skeleton, the number of the skeleton slots is same as the number of the optical fiber groups, and each of the skeleton slots is configured to receive a respective optical fiber group;
   wherein each of the optical fiber groups comprises a plurality of optical fiber units that are separately received in a corresponding one of the skeleton slots, the optical cable is vertically placed so that the optical fibers units received in the skeleton slot recline on inner walls of the skeleton slot;

wherein the optical cable skeleton is an SZ-shaped optical cable skeleton, and each of the skeleton slots is distributed on a periphery of the optical cable skeleton in an S-Z spiral shape; and wherein an S-Z angle of the SZ-shaped optical cable skeleton enables the skeleton slot to provide a support force for the optical fiber unit, wherein a combination of the support force provided by the skeleton slot and a friction force between the skeleton slot and the optical fiber unit substantially balances a gravity of the optical fiber unit when the optical cable is vertically placed.

2. The optical cable according to claim 1, wherein each skeleton slot comprises a bottom surface and two inner walls, and inclination angles exist between the two inner walls and the bottom surface respectively.

3. The optical cable according to claim 1, wherein the optical fiber unit is a tight buffered optical fiber unit, which comprises an optical fiber complying with a G.657 standard and a tight buffer tube disposed on a periphery of the optical fiber.

4. The optical cable according to claim 1, further comprising an outer protective sheath, wherein the outer protective sheath comprises optical fiber identifications, and the optical fiber identifications are disposed in positions corresponding to the skeleton slots.

5. The optical cable according to claim 4, wherein the optical fiber identifications are metal lines or metal strips nested in the protective sheath, and are used to mark positions of the skeleton slots for accommodating the optical fiber units.

6. An optical cable system, for a building having a plurality of floors, the system comprising:
a distribution box; and
a plurality of optical cables connected to the distribution box, wherein each of the optical cables comprises:
an optical cable skeleton;
a plurality of optical fiber units that are grouped into multiple optical fiber groups; and
wherein a plurality of skeleton slots are recessed in a periphery of the optical cable skeleton, the number of the skeleton slots is same as the number of the optical fiber groups, each of the skeleton slots is configured to receive a respective optical fiber group; at least a part of the optical fiber units in the skeleton slot are led and extended to a user premise on a corresponding floor through a splitter;
wherein each of the optical fiber groups comprises a plurality of optical fiber units that are separately received in a corresponding one of the skeleton slots, the optical cable is vertically placed so that the optical fibers units received in the skeleton slot recline on inner walls of the skeleton slot;
wherein the optical cable skeleton is an SZ-shaped optical cable skeleton, and each of the skeleton slots is distributed on a periphery of the optical cable skeleton in an S-Z spiral shape; and wherein an S-Z angle of the SZ-shaped optical cable skeleton enables the skeleton slot to provide a support force for the optical fiber unit, wherein a combination of the support force provided by the skeleton slot and a friction force between the skeleton slot and the optical fiber unit substantially balances a gravity of the optical fiber unit when the optical cable is vertically placed.

7. The optical cable system according to claim 6, wherein each skeleton slot comprises a bottom surface and two inner walls, and inclination angles exist between the two inner walls and the bottom surface respectively.

8. The optical cable system according to claim 6, wherein: the optical cable further comprises an outer protective sheath; the outer protective sheath comprises a window for leading the optical fiber unit; and the window is a ring-shaped window or a window disposed along the skeleton slot.

9. An optical cable, comprising:
a skeleton; and
a plurality of optical fiber units that are grouped into multiple optical fiber groups,
wherein the skeleton comprises a plurality of accommodating grooves that are distributed on a periphery of the optical cable skeleton in S-Z spiral shapes;
wherein the number of the accommodating grooves is same as the number of the optical fiber groups, and each of the accommodating grooves is configured to receive a respective optical fiber group;
the accommodating groove provides a support force and a friction force to uniformly stress the optical fiber units accommodated inside the accommodating groove when the optical cable is vertically placed;
wherein each of the optical fiber groups comprises a plurality of optical fiber units that are separately received in a corresponding one of the accommodating grooves, the optical fibers units inside the accommodating groove recline on inner walls of the accommodating groove;
wherein each accommodating groove comprises a bottom surface, and a width of an opening of the accommodating groove is greater than a width of the bottom surface;
wherein the optical cable further comprises: an outer protective sheath; and
wherein the outer protective sheath comprises optical fiber identifications, and the optical fiber identifications are nested in the outer protective sheath and used to mark positions of the accommodating grooves for accommodating the optical fiber units.

10. The optical cable according to claim 9, wherein the optical fiber unit is a tight buffered optical fiber unit, which comprises an optical fiber complying with a G.657 standard and a tight buffer tube disposed on a periphery of the optical fiber.

* * * * *